(12) United States Patent
Kolehmainen

(10) Patent No.: US 9,941,756 B2
(45) Date of Patent: *Apr. 10, 2018

(54) ROTOR FOR AN ELECTRIC MACHINE, AN ELECTRIC MACHINE AND METHOD FOR MANUFACTURING AN ELECTRIC MACHINE

(71) Applicant: ABB Schweiz AG, Baden (CH)

(72) Inventor: Jere Kolehmainen, Vaasa (FI)

(73) Assignee: ABB Schweiz AG, Baden (CH)

( * ) Notice: Subject to any disclaimer, the term of this patent is extended or adjusted under 35 U.S.C. 154(b) by 319 days.

This patent is subject to a terminal disclaimer.

(21) Appl. No.: 14/737,157

(22) Filed: Jun. 11, 2015

(65) Prior Publication Data

US 2015/0280498 A1 Oct. 1, 2015

Related U.S. Application Data

(63) Continuation of application No. PCT/EP2013/076016, filed on Dec. 10, 2013.

(30) Foreign Application Priority Data

Dec. 14, 2012 (EP) .................................... 12197147

(51) Int. Cl.
*F02K 1/08* (2006.01)
*H02K 1/24* (2006.01)
(Continued)

(52) U.S. Cl.
CPC ........... *H02K 1/246* (2013.01); *H02K 1/2766* (2013.01); *H02K 15/022* (2013.01); *Y10T 29/49012* (2015.01)

(58) Field of Classification Search
CPC .... H02K 1/246; H02K 1/2766; H02K 15/022; Y10T 29/49012
(Continued)

(56) References Cited

U.S. PATENT DOCUMENTS 6,239,526 B1 * 5/2001 Oh .................... H02K 1/246
310/162
6,259,181 B1 7/2001 Kawano et al.
(Continued)

FOREIGN PATENT DOCUMENTS

EP 1 164 683 A2 12/2001
EP 2 169 805 A1 3/2010
(Continued)

OTHER PUBLICATIONS

International Search Report (PCT/ISA/210) dated Feb. 19, 2014, by the European Patent Office as the International Searching Authority for International Application No. PCT/EP2013/076016.
(Continued)

*Primary Examiner* — Forrest M Phillips
(74) *Attorney, Agent, or Firm* — Taft Stettinius & Hollister LLP

(57) ABSTRACT

A rotor for an electric machine includes a rotor core having a plurality of rotor sheets (RS1), each of the plurality of rotor sheets including a plurality of flux guide sections, each of the plurality of flux guide sections having a plurality of flux paths and a plurality of flux barriers. The plurality of flux guide sections having a first flux guide section in which a first number of the plurality of flux barriers has a bridge interrupting the flux barrier, and a second flux guide section in which a second number of the plurality of flux barriers has a bridge interrupting the flux barrier. Each bridge is made of a material of high permeance, and the first number of the first flux guide section is different than the second number of the second flux guide section.

13 Claims, 3 Drawing Sheets

(51) Int. Cl.
*H02K 1/27* (2006.01)
*H02K 15/02* (2006.01)

(58) Field of Classification Search
USPC .................................... 310/156.02, 156.81
See application file for complete search history.

(56) References Cited

U.S. PATENT DOCUMENTS

| | | | |
|---|---|---|---|
| 6,300,703 B1 | 10/2001 | Kawano et al. | |
| 9,130,422 B2 * | 9/2015 | Rahman ................... | H02K 1/02 |
| 9,577,481 B2 * | 2/2017 | Kolehmainen ........ | H02K 1/246 |
| 2002/0070620 A1 * | 6/2002 | Naito ..................... | H02K 15/03 |
| | | | 310/156.56 |
| 2012/0074801 A1 * | 3/2012 | Brown ..................... | H02K 1/32 |
| | | | 310/59 |
| 2012/0139464 A1 | 6/2012 | Filipeti et al. | |
| 2012/0293038 A1 * | 11/2012 | Ikaheimo ............... | H02K 1/246 |
| | | | 310/216.113 |
| 2013/0119819 A1 * | 5/2013 | Lendenmann ....... | H02K 19/103 |
| | | | 310/216.107 |

FOREIGN PATENT DOCUMENTS

| | | |
|---|---|---|
| JP | 2003052156 A | 2/2003 |
| KR | 1020080105580 A | 12/2008 |
| WO | WO 98/40952 A1 | 9/1998 |
| WO | WO 2010/131233 A2 | 11/2010 |

OTHER PUBLICATIONS

Written Opinion (PCT/ISA/237) dated Feb. 19, 2014, by the European Patent Office as the International Searching Authority for International Application No. PCT/EP2013/076016.

European Search Report dated Jun. 12, 2013 for Application No. 12197147.7.

* cited by examiner

ROTOR FOR AN ELECTRIC MACHINE, AN ELECTRIC MACHINE AND METHOD FOR MANUFACTURING AN ELECTRIC MACHINE

RELATED APPLICATION(S)

This application claims priority under 35 U.S.C. § 120 to International Application PCT/EP2013/076016 which was filed on Dec. 10, 2013, designated the U.S., and claimed priority to European application 12197147.7 filed on Dec. 14, 2012. The content of each prior application is hereby incorporated by reference in its entirety.

FIELD

The present disclosure relates to a rotor for an electric machines, to an electric machine including said rotor, and to a method for manufacturing an electric machine.

BACKGROUND INFORMATION

In an electric machine rotor provided with a plural number of magnetic poles, arranged substantially at equal intervals along the circumference of the rotor, each magnetic pole can have a direct pole axis, or a direct axis. Two adjacent direct pole axes form an angle that is bisected by a quadrature axis. The reactance corresponding to the direct pole axis can be called a direct-axis reactance and the reactance corresponding to the quadrature axis a quadrature-axis reactance. A reluctance torque can be proportional to a difference of inverse values of the quadrature-axis reactance and the direct-axis reactance, which difference can be written as $1/X_q - 1/X_d$. Therefore a reluctance torque can be increased by increasing the direct-axis reactance or by reducing the quadrature-axis reactance.

A known rotor of a reluctance machine includes a rotor core having a plurality of identical rotor sheets stacked in an axial direction. Each of the plurality of rotor sheets includes a plurality of flux guide sections located along circumferential direction of the rotor sheet, each of the plurality of flux guide sections including a plurality of flux paths made of a material of high permeance and a plurality of flux barriers made of a material of low permeance. The flux paths and flux barriers can be located alternately along radial direction of the flux guide section. For mechanical reasons there can be bridges made of a material of high permeance connecting adjacent flux paths. Each flux barrier located closest to the centre axis of the rotor sheet in corresponding flux guide section can have a bridge that crosses the flux barrier substantially at the quadrature axis of the flux guide section. Further, each flux barrier located second closest to the centre axis of the rotor sheet in corresponding flux guide section can have a bridge that crosses the flux barrier substantially at the quadrature axis of the flux guide section.

The bridges should be as narrow as possible in order to avoid undesirable leak flux from one flux path to another. The leak flux decreases efficiency and maximum torque and increases no-load current thereby deteriorating electrical properties of the electric machine. Therefore, the narrower the bridges can be the better electrical properties of the electric machine.

A known rotor of a reluctance machine can have been manufactured by punching flux barriers and other specified openings into a ferromagnetic sheets and stacking these sheets to form the rotor core. A plurality of rotor sheets manufactured by punching can be stacked between end plates, the plurality of rotor sheets being attached to the end plates by bolts extending through the rotor sheets.

A problem associated with punching can be that narrow bridges cannot be formed with it.

SUMMARY

An exemplary rotor for an electric machine is disclosed, comprising: a rotor core having a plurality of rotor sheets stacked in an axial direction, wherein each of the plurality of rotor sheets having a plurality of flux guide sections located along a circumferential direction of the rotor sheet, wherein each of the plurality of flux guide sections including a plurality of flux paths made of a material of high permeance and a plurality of flux barriers made of a material of low permeance located alternately along a radial direction of the flux guide section, and wherein the plurality of flux guide sections includes: a first flux guide section in which a first number of the plurality of flux barriers has a bridge interrupting the flux barrier; and a second flux guide section in which a second number of the plurality of flux barriers has a bridge interrupting the flux barrier, wherein each of the bridges being made of a material of high permeance, wherein the first number is different than the second number.

BRIEF DESCRIPTION OF THE DRAWINGS

In the following the disclosure will be described in greater detail exemplary embodiments with reference to the attached drawings, in which.

DETAILED DESCRIPTION

Exemplary embodiments of the present disclosure improve electrical properties of an electric machine whose rotor sheets include bridges while being obtainable by punching.

The exemplary embodiments described herein provide a rotor sheet which includes at least two types of flux guide sections, each said type of flux guide section having a different number of flux barriers with bridges compared with the rest of the types. In a rotor the rotor sheets can be arranged such that adjacent a first type flux guide section in the axial direction there can be a second type flux guide section. Because rotor sheets can be axially pressed against each other, a bridge in a flux barrier of a first flux guide section can also be capable of supporting a flux barrier of a second flux guide section located adjacent the first flux guide section in the axial direction. In an axial series of flux barriers some flux barriers have a bridge and the others do not have a bridge. Therefore an average bridge width in the axial series of flux barriers can be less than an average bridge width of actual bridges in the axial series of flux barriers.

An advantage of the disclosure can be that electrical properties of an electric machine having rotor sheets including bridges crossing flux barriers can be improved without need to reduce width of the bridges. In a way the present disclosure reduces effective width of bridges without need to reduce actual width thereof.

Figure 1:
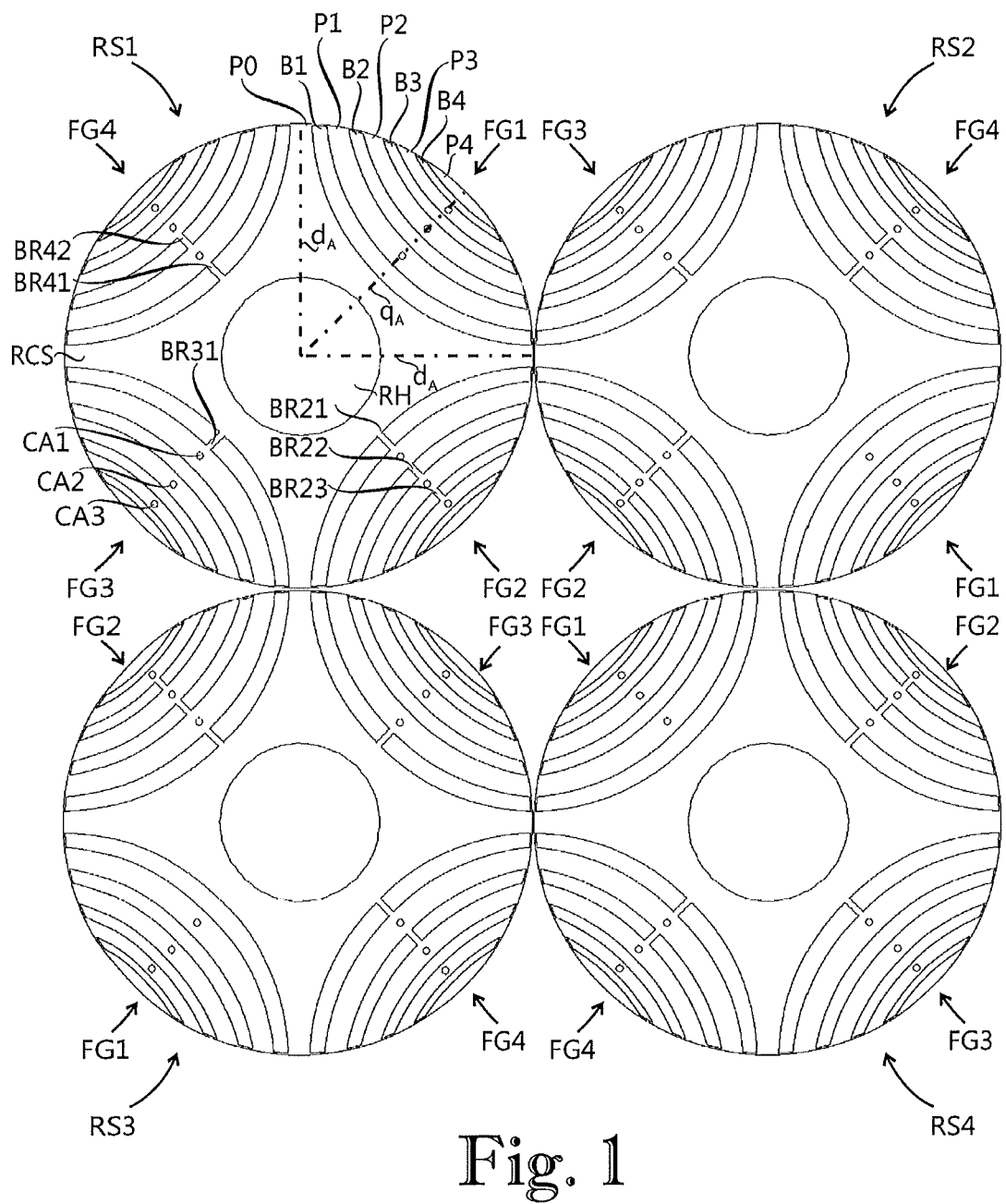
FIG. 1 shows four successive rotor sheets of a rotor according to an exemplary embodiment of the present disclosure.

FIG. 1 shows four successive rotor sheets of a rotor according to an exemplary embodiment of the present disclosure. As shown in FIG. 1, the rotor sheets RS1, RS2, RS3 and RS4 can be successive rotor sheets of a rotor core of a four pole rotor according to an embodiment of the disclosure. The rotor sheets RS1-RS4 can be adapted for a synchronous reluctance machine. In the rotor core, the rotor sheets RS1-RS4 can be axially stacked such that rotor sheet RS2 can be stacked between rotor sheets RS1 and RS3, and rotor sheet RS3 can be stacked between rotor sheets RS2 and RS4.

Each of the rotor sheets RS1-RS4 includes flux guide sections FG1, FG2, FG3 and FG4 located along a circumferential direction of the rotor sheet. Each of the flux guide sections FG1-FG4 includes flux paths P1, P2, P3 and P4 made of a material of high permeance and flux barriers B1, B2, B3 and B4 made of a material of low permeance. Flux paths and flux barriers can be located alternately along a radial direction of corresponding flux guide section.

Flux paths P1-P4 can be arranged to conduct magnetic flux from a first extremity of the flux path to a second extremity thereof, both the first extremity and the second extremity ending at the rotor surface and being spaced apart from one another at the rotor surface in the direction of its circumference. Flux paths P1-P3 can be shaped in such a way that the circumferential extremities, e.g., those above referred to as the first and the second extremity, can be at a substantially greater radial distance from the mid-axis of the rotor than an outer surface of a centre portion of the flux path in question. Flux paths P1-P3 can be curved inwardly.

Each flux barrier B1-B4 can be arranged to increase the ratio of direct-axis reactance to quadrature-axis reactance. In other words, each flux barrier B1-B4 can be arranged to provide a high magnetic resistance between adjacent elements made of a material of high permeance.

Each of the rotor sheets RS1-RS4 further includes a centre section RCS. The centre section RCS can be substantially X-shaped, with each tip of the X extending to the surface of the rotor. The direct pole axis $d_A$ of each magnetic pole passes through the portion of the centre section RCS that extends to the rotor surface. In the middle of the centre section RCS there can be a hole RH arranged to receive a rotor shaft.

The centre section RCS can be made of material of high permeance. Therefore the centre section RCS forms a centre flux path P0 for each flux guide section. Each centre flux path P0 can be located adjacent a respective flux barrier B1, and can be arranged to conduct magnetic flux from a first extremity of the centre flux path to a second extremity thereof, both the first extremity and the second extremity ending at the rotor surface.

The rotor sheets RS1-RS4 can be identical with each other. In a rotor core, successive rotor sheets can be offset by π/4 radians)(90°) wherein flux guide section FG4 of rotor sheet RS2 can be stacked between flux guide section FG1 of rotor sheet RS1 and flux guide section FG3 of rotor sheet RS3, and flux guide section FG3 of rotor sheet RS3 can be stacked between flux guide section FG4 of rotor sheet RS2 and flux guide section FG2 of rotor sheet RS4.

In flux guide section FG1 none of flux barriers B1-B4 can have a bridge interrupting the flux barrier. In flux guide section FG2 a bridge BR21 interrupts the flux barrier B1, a bridge BR22 interrupts the flux barrier B2, and a bridge BR23 interrupts the flux barrier B3. In flux guide section FG3 a bridge BR31 interrupts the flux barrier B1. In flux guide section FG4 a bridge BR41 interrupts the flux barrier B1, and a bridge BR42 interrupts the flux barrier B2. Except for number of bridges the flux guide sections FG1, FG2, FG3 and FG4 can be identical with each other.

In the exemplary embodiment of FIG. 1, each of the bridges can be positioned such that a quadrature axis of the rotor traverses the bridge. Only a quadrature axis $q_A$ traversing flux guide section FG1 of rotor sheet RS1 can be depicted in FIG. 1, along with two direct pole axes $d_A$ which form an angle that can be bisected by the quadrature axis $q_A$. Each of the bridges can be symmetrical with relation to corresponding quadrature axis. Further, a width of each bridge can be substantially the same.

Each of the rotor sheets RS1-RS4 includes more bridges close to the centre axis of the rotor sheet than further from the centre axis of the rotor sheet. In each of the rotor sheets RS1-RS4 the innermost flux barriers B1 have a total of three bridges while flux barriers B2 have a total of two bridges, and flux barriers B3 have a total of one bridge.

Each of the rotor sheets RS1-RS4 includes a plurality of connection apertures. Each flux path P1 includes a connection aperture CA1, each flux path P2 includes a connection aperture CA2, and each flux path P3 includes a connection aperture CA3. The connection apertures can be adapted to receive bolts or bars for pressing rotor sheets of a stack together. Alternatively rotor sheets can be attached to each other by gluing, for example.

Figure 2:
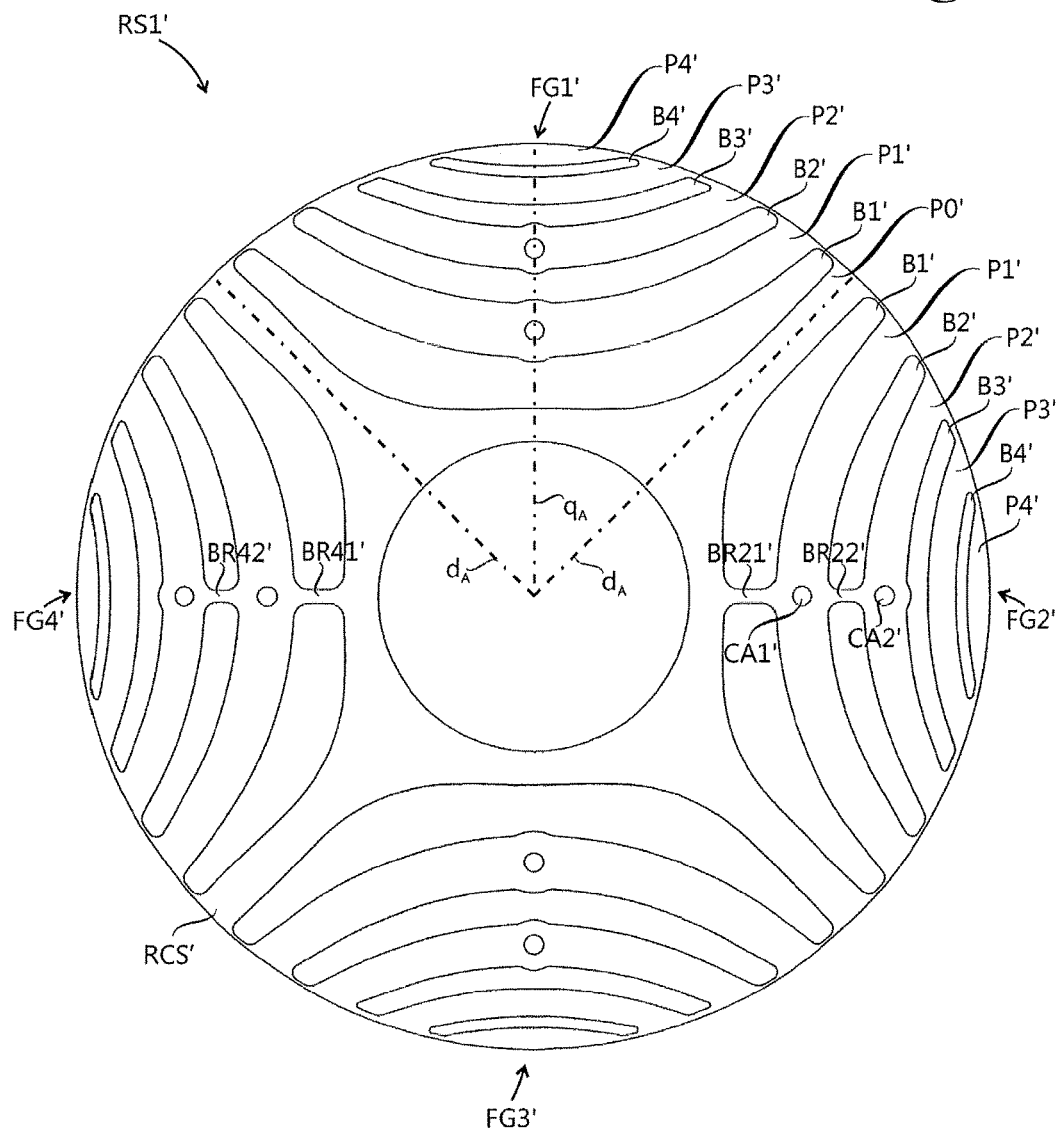
FIG. 2 shows a rotor sheet of a rotor according to an exemplary embodiment of the present disclosure.

FIG. 2 shows a rotor sheet of a rotor according to an exemplary embodiment of the present disclosure. As shown in FIG. 2, rotor sheet RS1' includes flux guide sections FG1', FG2', FG3' and FG4' located along circumferential direction of the rotor sheet RS1'. Each of the flux guide sections FG1'-FG4' includes flux paths P1', P2', P3' and P4' made of a material of high permeance and flux barriers B1', B2', B3' and B4' made of a material of low permeance. Flux paths and flux barriers can be located alternately along radial direction of corresponding flux guide section.

In flux guide section FG1' none of flux barriers B1'-B4' can have a bridge interrupting the flux barrier. Flux guide section FG3' can be identical with flux guide section FG1'. Flux guide section FG3' can be located π radians (180°) away from flux guide section FG1'. In flux guide section FG2' a bridge BR21' interrupts the flux barrier B1', and a bridge BR22' interrupts the flux barrier B2'. In flux guide section FG4', a bridge BR41' interrupts the flux barrier B1', and a bridge BR42' interrupts the flux barrier B2'. Flux guide section FG4' can be identical with flux guide section FG2'. Flux guide section FG4' can be located π radians (180°) away from flux guide section FG2'. Except for the bridges the flux guide sections FG1' and FG2' can be identical with each other.

Bridges in flux guide sections FG2' and FG4' can be positioned such that a quadrature axis of the rotor traverses them. Each of the bridges BR21', BR22', BR41' and BR42' can be symmetrical with relation to a corresponding quadrature axis. A width of each bridge can be substantially the same.

The rotor sheet RS1' can be symmetrical with relation to both a vertical line and a horizontal line, the vertical line coinciding with a quadrature axis bisecting flux guide section FG1', and the horizontal line coinciding with a quadrature axis bisecting flux guide section FG2'.

Rotor sheet RS1' includes more bridges close to the centre axis of the rotor sheet than further from the centre axis of the rotor sheet. The innermost flux barriers B1' have a total of two bridges. Flux barriers B2' also have a total of two bridges. The outermost flux barriers B3' and B4' do not have any bridges.

Rotor sheet RS1' includes a plurality of connection apertures. Each flux path P1' includes a connection aperture CA1', and each flux path P2' includes a connection aperture CA2'. The connection apertures can be adapted to receive bolts for pressing rotor sheets of a stack together.

Figure 3:
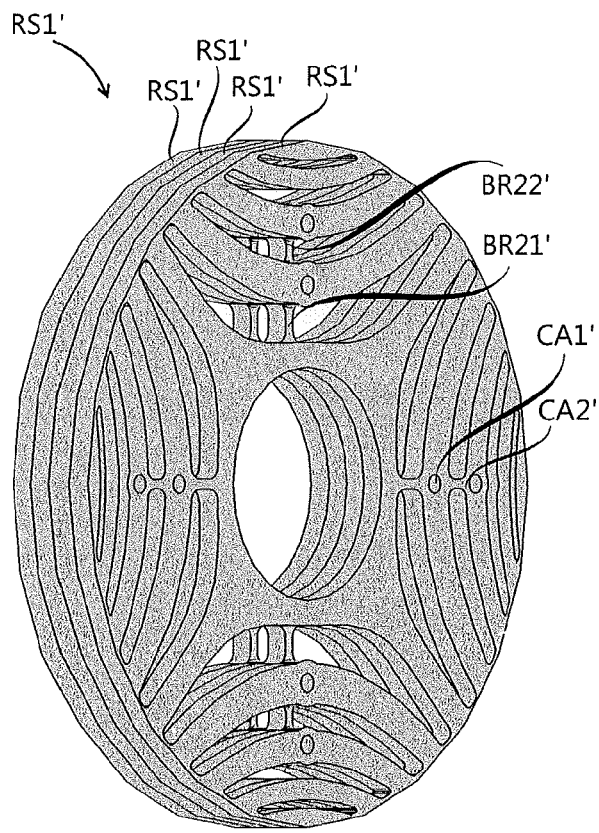
FIG. 3 shows four rotor sheets of FIG. 2 axially stacked according to an exemplary embodiment of the present disclosure.

FIG. 3 shows four rotor sheets of FIG. 2 axially stacked according to an exemplary embodiment of the present disclosure. As shown in FIG. 3, a stack of four rotor sheets has each one of the rotor sheets being identical with the rotor sheet RS1' shown in FIG. 2. Successive rotor sheets can be offset by π/4 radians (90°).

In a further embodiment a rotor core can have a plurality of rotor sheets stacked in an axial direction, the plurality of rotor sheets being arranged in a plurality of rotor sheet groups. Each rotor sheet group includes at least one rotor sheet, rotor sheets of each group being located successively to each other in the axial direction. Rotor sheets of each rotor sheet group can be identical with each other. Also positions of rotor sheets in a rotor sheet group can be identical, which means that each flux guide section in a rotor sheet group including more than one rotor sheets can be located adjacent an identical flux guide section. In other words identical flux guide sections can be aligned in a rotor sheet group while corresponding flux guide sections can be offset by a predetermined angle α in adjacent rotor sheet groups. The predetermined angle α can be defined by an equation $$\alpha = \frac{2\pi}{N_{FGS}},$$

where $N_{FGS}$ can be a number of flux guide sections in a rotor sheet. A number of flux guide sections in a rotor sheet can be equal to the number of poles.

According to exemplary embodiments of the present disclosure, a predetermined offset angle $\alpha_1$ can be different from the angle between adjacent poles. However, the predetermined angle $\alpha_1$ can always be greater than half of the angle between adjacent poles.

FIGS. 1 and 2 depict rotor sheets of a four pole rotor. However, exemplary embodiments of the present disclosure can be usable for any number of poles.

Each rotor sheet depicted in FIGS. 1 and 2 include a peripheral bridge assembly. The peripheral bridge assembly includes a plurality of peripheral bridges made of a material of high permeance. The peripheral bridges form, together with outer portions of flux paths, an unbroken ring made of a material of high permeance, the unbroken ring defining an outer circumference of corresponding rotor sheet. The unbroken ring strengthens the structure of the rotor sheet.

Bridges shown in FIGS. 1 and 2 can be radial bridges located at quadrature axis of corresponding flux guide section. Alternative exemplary embodiments can include bridges of different types, such as tangential bridges. Also, location of bridges can be different than what can be shown in FIGS. 1 and 2.

The material of low permeance can be selected on the basis of the type of the electric machine. In a reluctance motor the flux barriers can be filled with solid or powdery substances that can be weakly conductive both as regards the magnetic flux and electricity. Useful substances include, depending on the embodiment, resins, plastics and carbon fibres. Naturally, in some exemplary embodiments the material of low permeance can be air.

Exemplary embodiments described herein are not limited to reluctance machines. For example, it is possible to use a rotor according to present disclosure in a permanent magnet machine. It can be possible to use exemplary embodiments of the present disclosure in any stacked rotor having bridges.

Figure 4:
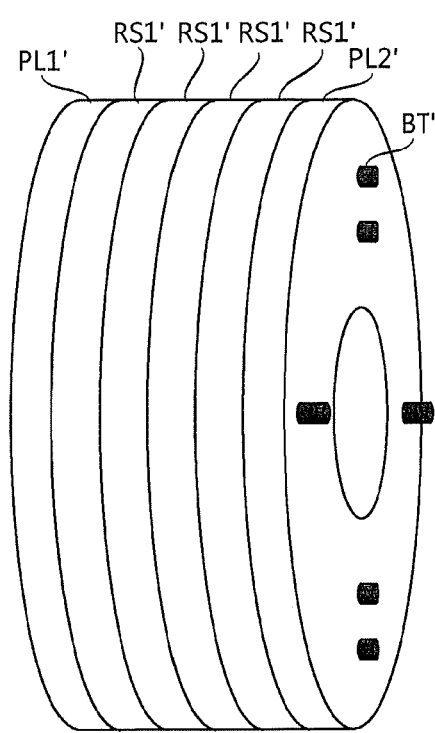
FIG. 4 shows a rotor including the rotor sheet stack of FIG. 3 according to an exemplary embodiment of the present disclosure.

FIG. 4 shows a rotor including the rotor sheet stack of FIG. 3 according to an exemplary embodiment of the present disclosure. The rotor further includes end plates PL1' and PL2'. End plate PL1' can be located at a first end of the rotor, and end plate PL2' can be located at a second end of the rotor. The four rotor sheets can be pressed between the end plates PL1' and PL'2 by bolts BT' extending through the connection apertures CA1' and CA2'.

Rotor sheets RS1-RS4 shown in FIG. 1 and rotor sheet RS1' shown in FIG. 2 can be manufactured from a ferromagnetic plate by punching. A rotor sheet can be formed by a single punching process, wherein the bridges of flux barriers can be formed by the single punching process. A rotor can include exclusively rotor sheets of one type in which case the rotor sheets can be formed with one punching tool. Said rotor sheets of one type can be automatically rotated for stacking.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A rotor for an electric machine, comprising:
a rotor core having a plurality of rotor sheets stacked in an axial direction,
wherein each of the plurality of rotor sheets having a plurality of flux guide sections located along a circumferential direction of the rotor sheet,
wherein each of the plurality of flux guide sections including a plurality of flux paths made of a material of high permeance and a plurality of flux barriers made of a material of low permeance located alternately along a radial direction of the flux guide section, and
wherein the plurality of flux guide sections includes:
a first flux guide section in which a first number of the plurality of flux barriers has a bridge interrupting the flux barrier; and
a second flux guide section in which a second number of the plurality of flux barriers has a bridge interrupting the flux barrier,
wherein each of the bridges being made of a material of high permeance, wherein the first number is different than the second number.

2. The rotor according to claim 1, wherein:
the plurality of rotor sheets are arranged in a plurality of rotor sheet groups, each rotor sheet group including at least one rotor sheet,
rotor sheets of each group are arranged successively in the axial direction,
first flux guide sections are aligned in each rotor sheet group and first flux guide sections of a group are offset by a predetermined angle compared to first flux guide sections of adjacent group.

3. The rotor according to claim 2, wherein the predetermined angle is defined by an equation $$\alpha = \frac{2\pi}{N_{FGS}},$$

where $N_{FGS}$ is a number of flux guide sections in a rotor sheet.

4. The rotor according to claim 2, wherein each of the plurality of rotor sheets is identical with each other rotor sheet of the plurality of rotor sheets.

5. The rotor according to claim 1, wherein each flux guide section has an equal number of flux paths and an equal number of flux barriers compared to the other flux guide sections.

6. The rotor according to claim 1, wherein a width of each bridge is substantially the same.

7. The rotor according to claim 1, wherein each bridge is positioned such that a quadrature axis of the rotor traverses the bridge.

8. The rotor according to claim 1, wherein each of the plurality of rotor sheets includes more bridges close to a centre axis of the rotor sheet than further from the centre axis of the rotor sheet.

9. The rotor according to claim 1, wherein the rotor further includes a pair of end plates each end plate being located at a respective end of the rotor, the plurality of rotor sheets being stacked between the end plates.

10. The rotor according to claim 9, wherein each of the plurality of rotor sheets includes a plurality of connection apertures, the plurality of rotor sheets are pressed between the end plates by bolts extending through the connection apertures.

11. The rotor according to claim 1, wherein the rotor is a rotor for a reluctance machine.

12. An electric machine comprising:
a rotor; and
a stator,
wherein the rotor of the electric machine is a rotor according to claim 1.

13. A method for manufacturing an electric machine according to claim 12, the method comprising:
providing the plurality of rotor sheets using a punching process.

* * * * *